United States Patent
Kazama et al.

(10) Patent No.: US 9,835,508 B2
(45) Date of Patent: Dec. 5, 2017

(54) PRESSURE SENSOR HAVING STRAIN GAUGES DISPOSED ON A DIAPHRAGM

(71) Applicant: Hitachi Automotive Systems, Ltd., Hitachinaka-shi, Ibaraki (JP)

(72) Inventors: Atsushi Kazama, Tokyo (JP); Hiroyuki Ota, Tokyo (JP); Jiro Hashizume, Tokyo (JP); Junji Onozuka, Hitachinaka (JP); Hiroshi Onuki, Hitachinaka (JP); Miho Tobita, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 241 days.

(21) Appl. No.: 14/647,351

(22) PCT Filed: Nov. 6, 2013

(86) PCT No.: PCT/JP2013/079950
§ 371 (c)(1),
(2) Date: Oct. 5, 2015

(87) PCT Pub. No.: WO2014/080759
PCT Pub. Date: May 30, 2014

(65) Prior Publication Data
US 2016/0025581 A1 Jan. 28, 2016

(30) Foreign Application Priority Data
Nov. 26, 2012 (JP) ................... 2012-257034

(51) Int. Cl.
*G01L 9/06* (2006.01)
*G01L 9/00* (2006.01)

(52) U.S. Cl.
CPC .......... *G01L 9/0054* (2013.01); *G01L 9/0042* (2013.01); *G01L 9/0055* (2013.01); *G01L 9/065* (2013.01)

(58) Field of Classification Search
CPC ....... G01L 9/0051; G01L 9/0052; G01L 9/06; G01L 9/0054; G01L 9/0042; G01L 9/065; G01L 9/0055
(Continued)

(56) References Cited

U.S. PATENT DOCUMENTS 4,275,406 A  6/1981 Muller et al.
5,289,721 A * 3/1994 Tanizawa ............... G01L 9/0042
                                                    73/721
(Continued)

FOREIGN PATENT DOCUMENTS

DE  41 30 044 A1  3/1992
DE  19833712 A   1/1999
(Continued)

*Primary Examiner* — Walter L Lindsay, Jr.
*Assistant Examiner* — Ruth Labombard
(74) *Attorney, Agent, or Firm* — Volpe and Koenig, P.C.

(57) ABSTRACT

An object of the present invention is to realize a pressure sensor with a small variation in sensor characteristics. The pressure sensor includes a diaphragm having longitudinal and lateral sides, and four strain gauges disposed on the diaphragm. The four strain gauges are arranged at a center of the diaphragm. Two of the four strain gauges are arranged along a lateral direction, and other two strain gauges are arranged along a longitudinal direction.

9 Claims, 12 Drawing Sheets

(58) Field of Classification Search
USPC .................................................. 73/721, 727
See application file for complete search history.

(56) References Cited

U.S. PATENT DOCUMENTS

| | | | |
|---|---|---|---|
| 5,877,039 A | 3/1999 | Tanizawa | |
| 2001/0039837 A1* | 11/2001 | Tanizawa | G01L 9/0055 73/715 |

FOREIGN PATENT DOCUMENTS

| | | | |
|---|---|---|---|
| FR | 2767193 A | 2/1999 |
| JP | 01-211986 A | 8/1989 |
| JP | 08-247872 A | 9/1996 |
| JP | 09-008329 A | 1/1997 |
| JP | 2615887 B2 | 6/1997 |
| JP | 2006-003100 A | 1/2006 |
| JP | 4161410 B2 | 10/2008 |

* cited by examiner (a)

(b)

(a)

(b)

(a)

(b)

(a)

(b)

PRESSURE SENSOR HAVING STRAIN GAUGES DISPOSED ON A DIAPHRAGM

TECHNICAL FIELD

The present invention relates to a pressure sensor configured to detect the pressure based on deformation of the diaphragm to which the pressure is applied.

BACKGROUND ART

The pressure sensor configured to have a strain gauge on the diaphragm has been well known. The pressure sensor of the aforementioned type detects the pressure based on change in the resistance of the strain gauge resulting from deformation of the diaphragm under the pressure. In general, four strain gauges constitute the bridge circuit that outputs the differential voltage in proportion to the pressure so as to be detected. The bridge circuit is employed mainly for temperature compensation on the ground that, if each of those four strain gauges changes similarly, the bridge circuit output is kept unchanged regardless of the temperature characteristic of the strain gauge.

The pressure sensor that uses the silicon diaphragm produced by processing the silicon substrate has been usually employed for detection of low pressure equal to or lower than 1 MPa approximately. Patent Literature 1 discloses formation of the strain gauge formed of the polycrystalline silicon on the thin diaphragm formed by etching the back surface of the silicon substrate. According to the Patent Literature 1, two of the four strain gauges are disposed at a periphery of the diaphragm, and the other two are disposed at the center of the diaphragm so that the stress in the strain gauge caused by the pressure application is brought into the compressive stress and the tensile stress, respectively. Furthermore, it is also disclosed that the strain gauge disposed at the center of the rectangular diaphragm allows reduction in the vertical stress which negatively acts upon sensitivity of the sensor.

As the pressure sensor for detecting high pressure equal to or higher than 1 MPa approximately, or the one for the use that does not allow exposure of the silicon because of corrosion resistance requirement, the pressure sensor configured by bonding the semiconductor strain gauge onto the stainless steel diaphragm, or bonding the sensor chip having the semiconductor strain gauge formed therein onto the diaphragm has been usually employed. Patent Literature 2 discloses that the sensor chip of single crystal semiconductor, having the strain gauge formed therein is joined onto the circular metal diaphragm. The sensor chip has the size larger than the diaphragm so that the strain gauge on the sensor chip is disposed at the periphery of the diaphragm. According to the Patent Literature 2, two of the four strain gauges are disposed in the circumferential direction, and the other two are disposed in the radial direction so that the stress that occurs in the respective strain gauges under the applied pressure is brought into the compressive stress and the tensile stress, respectively. This makes it possible to provide the sensor sensitivity. In the disclosure, the sensor chip is formed into the polygon shape as nearly as possible to the circular shape so as to eliminate the adverse influence of the thermal stress owing to difference in the linear expansion coefficient between the sensor chip and the diaphragm as much as possible.

CITATION LIST

Patent Literature

PTL 1: Japanese Patent No. 2615887
PTL 2: Japanese Patent No. 4161410

SUMMARY OF INVENTION

Technical Problem

The generally employed pressure sensor as described above is configured that at least two of those four strain gauges are disposed at the outer periphery of the diaphragm. The stress distribution of the diaphragm with respect to the pressure application at the outer periphery changes more steeply than the center. Therefore, the detection error caused by the misalignment of the strain gauge becomes larger than the inner periphery. The stress distribution at the outer periphery of the diaphragm is likely to be influenced by the position of the edge of the diaphragm and the edge shape such as R shape. In the case where the position and shape of the edge of the diaphragm are changed, there may cause the risk of varying the stress distribution at the outer periphery of the diaphragm.

There is still room to examine the change in the stress applied to the strain gauge disposed at the outer periphery of the diaphragm of the generally employed pressure sensor as described above, which may vary the sensor characteristics.

It is an object of the present invention to realize the pressure sensor having less variable sensor characteristics.
Solution to Problem In order to solve the aforementioned problem, the pressure sensor according to the present invention includes a diaphragm having longitudinal and lateral sides, and four strain gauges disposed on the diaphragm. The four strain gauges are arranged at a center of the diaphragm. Two of the four strain gauges are arranged along a lateral direction, and other two strain gauges are arranged along a longitudinal direction.
Advantageous Effects of Invention The present invention is capable of realizing the pressure sensor having less variable sensor characteristics.

DESCRIPTION OF EMBODIMENT

Figure 1:
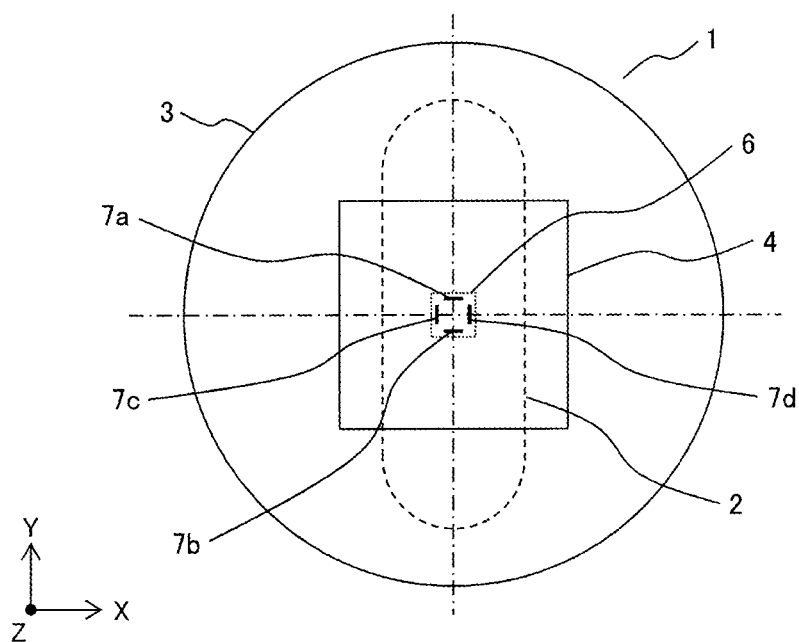
FIG. 1(a) is a plan view and FIG. 1(b) is a sectional view of a first embodiment according to the present invention.
Figure 1:
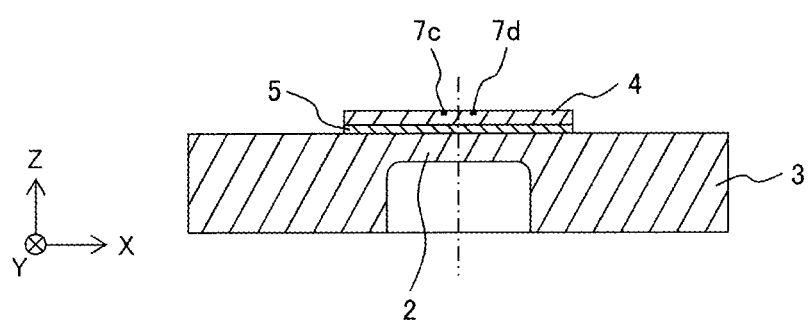
Figure 2:
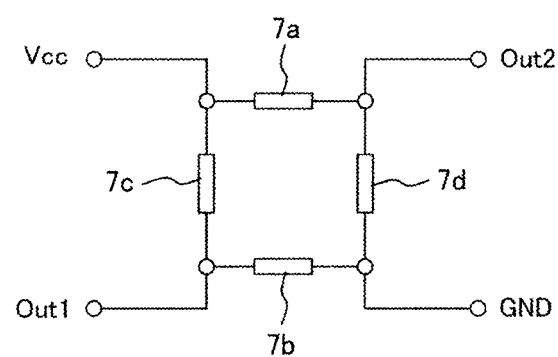
FIG. 2 is an explanatory view of an example of a bridge circuit.

FIG. 1(a) and FIG. 1(b) are a plan view and a sectional view of the first embodiment of the pressure sensor according to the present invention. The pressure sensor 1 is configured by attaching a rectangular sensor chip 4 onto a metal sensor housing 3 provided with a diaphragm 2 via a junction layer 5. Referring to FIG. 1(a), the dotted line indicates the outline of the diaphragm 2. The sensor chip 4 includes a gauge region 6 at the center on the surface which is not joined with the diaphragm. In the gauge region 6, four strain gauges 7 (first to fourth strain gauges 7a to 7d) are disposed. The four strain gauges 7 are connected with a not shown wiring to form a Wheatstone bridge circuit as shown in FIG. 2. The diaphragm 2 includes lateral and longitudinal sides as X and Y axes, respectively. The gauge region 6 is disposed at the center of the diaphragm 2. The first strain gauge 7a and the second strain gauge 7b are arranged so that the lateral direction (X axial direction) of the diaphragm 2 corresponds to the current direction, and the third strain gauge 7c and the fourth strain gauge 7d are arranged so that the longitudinal direction (Y axial direction) of the diaphragm 2 corresponds to the current direction. The pressure sensor 1 is configured that the diaphragm 2 is deformed under the pressure applied to the surface of the diaphragm 2, which is opposite the surface joined with the sensor chip 4, and the resultant change in the stress of the strain gauge 7 varies resistance thereof. As a result, the differential output in proportion to the pressure is derived from the bridge circuit.

The sensor housing 3 including the diaphragm 2 is made of the metallic material such as stainless steel. The cylindrical sensor housing 3 has its center part processed from one side to form a thin section as the diaphragm 2 through cutting, electric discharge machining, press working or the like. Each end of the processed surface of the diaphragm 2 is formed to have an R shape, serving to alleviate stress concentration generated at the respective end portions during pressure application.

The single crystal silicon substrate is used for producing the sensor chip 4. The strain gauge 7 is a piezoresistance gauge of p-type silicon produced through impurity diffusion. The silicon substrate of crystal plane (100) is used so that both the X and Y axes correspond to the silicon crystal axis <110>. Accordingly, the first to the fourth strain gauges 7a to 7d are all piezoresistance gauges in the direction of p-type silicon <110>.

The Au/Sn solder is used for the junction layer 5. In the junction process, the Ni/Au film is formed on the junction surface of the sensor chip 4 through sputtering, and the Sn film is formed through plating on the area of the diaphragm 2 to be joined with the sensor chip 4. The Au/Sn pellet is interposed between those films for alignment, and melted in the heat for junction.

The pressure sensor according to the present invention is characterized in that all the four strain gauges 7 (first to fourth strain gauges 7a to 7d) are disposed adjacently to one another in the gauge region 6 at the center of the diaphragm 2. The stress distribution on the surface of the diaphragm 2, which is generated under the applied pressure at the center becomes less steep than the one in the area around the end portion of the diaphragm 2. In the case where the junction position of the sensor chip 4 is shifted to cause the relative misalignment of the strain gauge 7 with the diaphragm 2, the stress generated in the strain gauge 7 hardly occurs. This makes it possible to lessen variation in the sensor sensitivity resulting from the misalignment.

The pressure sensor 1 according to the present invention is characterized in that the diaphragm 2 has longitudinal and lateral sides, and two of the four strain gauges 7 are arranged along the longitudinal (Y axis) direction, and the other two are arranged along the lateral (X axis) direction. Referring to the Wheatstone bridge circuit shown in FIG. 2, the stress difference is generated between the group of the first gauge 7a and the second gauge 7b, and the group of the third gauge 7c and the fourth gauge 7d so that the difference in the midpoint potential is output. If all the stress values derived from the first to the fourth gauges 7a to 7d are the same, the output cannot be obtained, and accordingly, the sensor sensitivity is zero. In the case where those four strain gauges 7 are arranged at the center of the diaphragm 2 with a circular or a square shape, each stress generated at the center of the diaphragm 2 is equal both in the X and Y axial directions. As a result, the sensor sensitivity becomes zero. The diaphragm 2 according to the present invention has a long length in the Y axial direction so that the stress generated at the center of the diaphragm 2 in the X axial direction becomes larger than the one in the Y axial direction. The stress generated in the group of the first strain gauge 7a and the second strain gauge 7b while having the current direction corresponding to the X axial direction is different from the stress generated in the group of the third gauge 7c and the fourth gauge 7d while having the current direction corresponding to the Y axial direction as well as different variation in the resistance in accordance with the stress change. This makes it possible to obtain the sensor sensitivity.

The pressure sensor 1 according to the present invention has the effect for lessening the sensor output variation in response to the temperature change. As described above, the strain gauge 7 is produced through impurity diffusion employed for semiconductor manufacturing. The highly managed process allows the strain gauge to exhibit further uniform feature such as initial resistance, piezoresistance coefficient, and temperature dependence of the piezoresistance coefficient as well as variation in response to the temperature change. The uniform variation is offset by the Wheatstone bridge so that the output hardly varies. In the case where the strain gauges 7 are positioned apart from each other, there may be the risk of the difference in each resistance change of the respective strain gauges upon generation of the temperature difference in the sensor chip 4. In the present invention, as four strain gauges 7 are arranged adjacently to one another, the temperature difference hardly occurs, preventing variation of the sensor output. The temperature change will cause the thermal stress resulting from the linear expansion coefficient difference between the diaphragm 2 and the sensor chip 4. The thermal stress becomes substantially isotropic except in the area around the end portion of the sensor chip 4. As a result, all the stress values of the four strain gauges 7 become substantially equal to one another, suppressing the output variation. If some of the four strain gauges are disposed near the end portion of the sensor chip 4, the output is likely to vary owing to the thermal stress difference. In the present invention, all the four strain gauges 7 are arranged at the center of the sensor chip 4 so that there is substantially no difference in the thermal stress. The diaphragm is shaped to have anisotropic feature, generating slight difference in the thermal stress between directions of X axis and Y axis, which causes the output to vary. The thermal stress distribution at the center of the diaphragm 2 is less steep. Therefore, the output variation owing to the thermal stress hardly occurs in response to the misalignment of the strain gauge 4.

As for the positional relationship between the diaphragm 2 and the sensor chip 4, it is preferable to set the dimension of the sensor chip 4 to be larger than that of the diaphragm 2 when seen in the X axial direction (YZ cross section).

In the aforementioned structure, the end portion of the sensor chip 4 is located at the outer side of the diaphragm 2. This makes it possible to prevent generation of the high stress at the junction end portion of the sensor chip 4, thus allowing variation of the sensor features to be lessened.

Furthermore, it is preferable to set the dimension of the sensor chip 4 to be smaller than that of the diaphragm 2 when seen in the Y axial direction (XZ cross section).

If the sensor chip 4 is made larger than necessary, there may be concerns about the cost increase for manufacturing the sensor chip 4, and the high thermal stress generated at the junction portion of the sensor chip 4 owing to the linear expansion coefficient difference between the sensor chip 4 and the diaphragm 2. The diaphragm 2 will be made into small size in order to be completely disposed inside the sensor chip 4 with limited size. This may cause steep variation in the stress distribution on the diaphragm 2, thus limiting the region which allows the strain gauge 7 to be disposed, resulting in large influence of misalignment of the strain gauge 7. Then, the size of the diaphragm 2 in the lateral direction is made smaller than the sensor chip 4, and the size in the longitudinal direction is made larger than the sensor chip 4 so as to prevent reduction in the size of the diaphragm 2, and to reduce the stress generated at the edge of the junction portion of the sensor chip 4.

Besides the bridge circuit, the sensor chip 4 allows formation of the peripheral circuit therein, for example, output amplifier, current source, A/D converter, output correcting circuit, memory for storing the correction value, and temperature sensor. The aforementioned signal processing circuit formed in the sensor chip 4 ensures amplification of the output signal, temperature correction, and zero point correction, resulting in the highly accurate output signal. In the case of the temperature correction, the strain gauge 7 and the temperature sensor may be formed in the same sensor chip 4, which allows accurate measurement of temperature of the strain gauge 7, and highly accurate temperature correction.

In the embodiment, the diaphragm 2 to which the pressure is applied, and the sensor housing 3 are made of stainless steel. This allows configuration of the sensor to exhibit high yield strength with high pressure measuring range. It may be used for the application with high corrosion-susceptibility by liquid or gas as the measurement object. As for selection of the material, the stainless steel of precipitation hardening type such as SUS630 may be selected to meet the yield strength requirement. Meanwhile, the stainless steel with high corrosion resistance such as SUS316 may be selected to meet the corrosion resistance requirement. Besides the stainless steel, various kinds of steel may be selected in consideration of yield strength, corrosion resistance, and difference in the linear expansion coefficient from the silicon.

The material for forming the junction layer 5 and the junction process are not limited to those described above. Use of Au/Ge solder and Au/Si solder may lessen the creep deformation in the junction layer 5. In the case where the application allows the creep deformation which is likely to occur, various kinds of adhesive agents may be used. Besides the use of the Au/Su pellet, the junction process includes the method for forming the Au/Sn directly on the diaphragm or the back surface of the sensor chip through plating.

Figure 3:
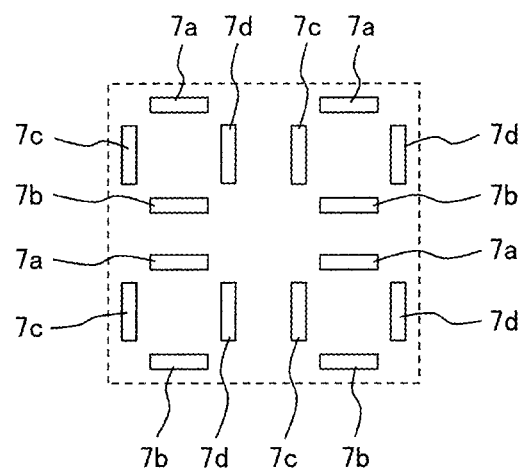
FIGS. 3(a)-(b) are a schematic view showing a second embodiment according to the present invention.
Figure 3:
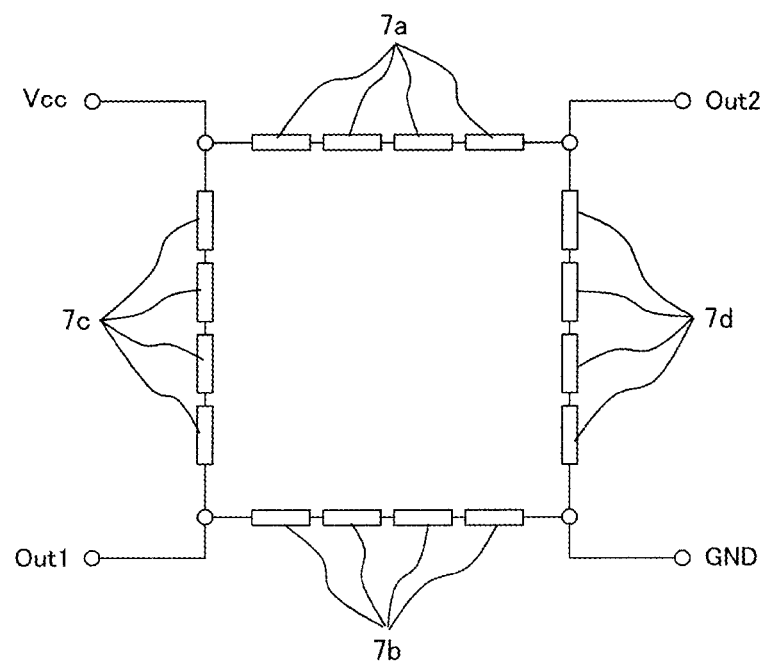

A second embodiment of the present invention will be described referring to FIGS. 3(a)-(b). Explanation of the similar structures to those of the first embodiment will be omitted.

The first to the fourth strain gauges 7a to 7d are arranged so as to connect a plurality of piezoresistances in series. FIG. 3(a) illustrates the arrangement of the strain gauges 7 in the gauge region 6. FIG. 3(b) illustrates the bridge circuit structure. Four groups of piezoresistance each including the first to the fourth strain gauges 7a to 7d are arranged in the gauge region. Four divided sections of the first strain gauge 7a are connected in series through a not shown wiring. Each of the second to the fourth strain gauges 7b to 7d is also arranged in the similar manner. Referring to FIG. 3(b), four separated strain gauges are arranged in one unit to constitute the bridge circuit that is equivalent to the one as shown in FIG. 2.

The separated strain gauges are dispersedly arranged in the gauge region 6, thus providing the effect of making the average value of the stress uniform. For example, if the stress cannot be uniformly distributed in the gauge region 6, and the gradient is formed in the Y direction, the arrangement that the first strain gauge 7a and the second strain gauge 7b are separately arranged in the positive and the negative areas with respect to the Y axis in the gauge region 6 may cause the stress difference between those gauges, which will be output. The second embodiment is configured to provide the divided strain gauges so as to be dispersedly arranged in the gauge region 6. This may suppress generation of the stress difference between the strain gauges 7.

Figure 4:
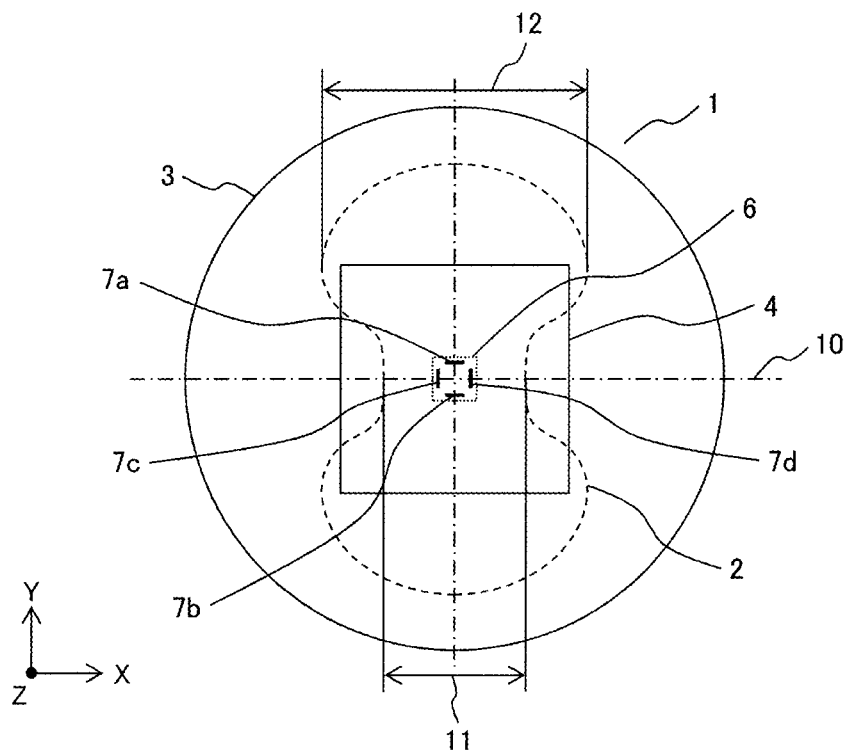
FIG. 4(a) is a plan view and FIG. 4(b) is a sectional view of a third embodiment according to the present invention.
Figure 4:
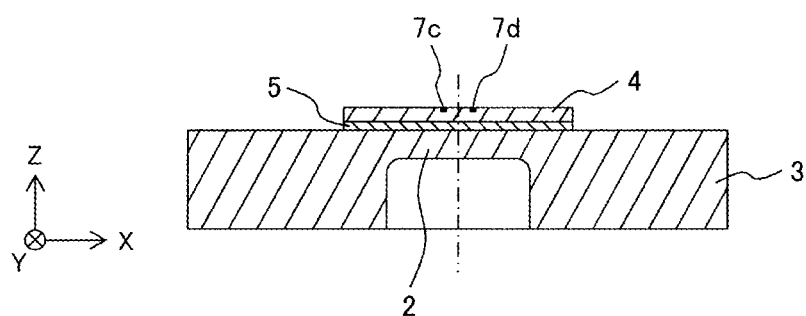

A third embodiment according to the present invention will be described referring to FIG. 4. Explanations of the similar structures to those described in the first embodiment will be omitted.

FIGS. 4(a) and 4(b) are a plan view and a sectional view illustrating the third embodiment of the pressure sensor 1 according to the present invention. Referring to FIG. 4(a), the center line along the X axis is designated as an X center line 10. FIG. 4(b) is the sectional view taken along the X center line 10.

The diaphragm 2 has an hourglass-like shape, having the lateral dimension in the region from the center to the end portion in the longitudinal direction larger than the lateral dimension around the center in the longitudinal direction. Assuming that the dimension of the diaphragm 2 on the X center line 10 is designated as the diaphragm center dimension 11, the X axial dimension (diaphragm end dimension 12) of the diaphragm 2 around the end portion in the longitudinal direction apart from the X center line in the Y axial direction is larger than the aforementioned diaphragm center dimension 11.

The embodiment having the diaphragm with the narrow part at the center may increase the stress difference at the center of the diaphragm 2 between the lateral direction and the longitudinal direction compared with the case having the diaphragm with no narrow part. As the sensor sensitivity is proportional to the stress difference, stress utilization efficiency with respect to the sensor sensitivity (the ratio of the sensor sensitivity to the maximum stress generated in the strain gauge) is improved. Variation in the stress distribution around the center of the diaphragm 2 is reduced, thus further lessening the influence of the misalignment.

It is possible to employ the strain gauge 7 with the structure as described in the second embodiment.

A fourth embodiment of the present invention will be described referring to FIG. 5. The explanation of the similar structures to those described in the first embodiment will be omitted.

FIGS. 5(a) and 5(b) are a plan view and a sectional view illustrating the fourth embodiment of the pressure sensor according to the present invention. Referring to FIG. 5(a), the center line along the X axis is designated as the X center line 10. FIG. 5(b) is a sectional view taken along the X center line 10.

A silicon substrate 13 has a sensor diaphragm 14 with reduced thickness. A gauge region 6 is located on the surface of the sensor diaphragm 14 at the center. The first to the fourth strain gauges 7a to 7d are formed in the gauge region 6.

In this embodiment, the silicon diaphragm formed by processing the silicon substrate is used, and the number of parts is smaller than the structure with the additional sensor chip. This makes it possible to eliminate the process step for joining the sensor chip, causing no problem of creep deformation in the junction portion of the sensor chip. It is preferable to employ the structure of this embodiment if the pressure to be measured is not so high, or the problem of corrosion by the measurement object of liquid and gas rarely occurs.

Wet etching or dry etching may be employed as the method of processing the sensor diaphragm 14 in the silicon substrate 13. In order to highly manage the thickness of the sensor diaphragm 14 with high accuracy, SOI (Silicon on Insulator) substrate derived from laminating the thin silicon layer and the thick silicon layer via the silicon oxide film layer may be used as the silicon substrate 13. The thickness of the silicon diaphragm 14 is determined by the thickness of the thin silicon layer in the process of removing the oxide film layer after processing the thick silicon layer. Therefore, the thickness is not changed by the process.

Figure 5:
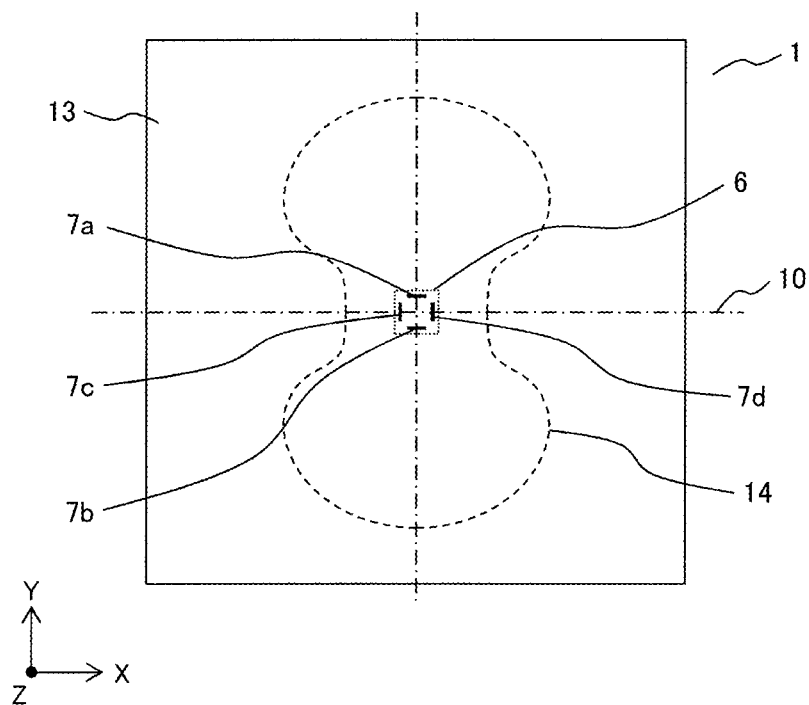
FIG. 5(a) is a plan view and FIG. 5(b) is a sectional view of a fourth embodiment according to the present invention.
Figure 5:
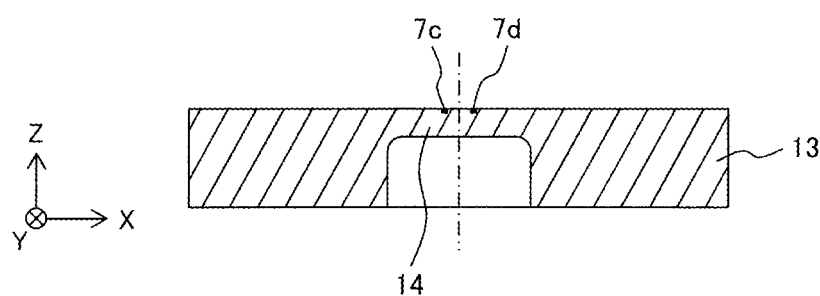

It is clearly understood that the shape of the sensor diaphragm 14 is not limited to the hourglass-like shape as shown in FIG. 5 so long as it has the shape with the longitudinal and the lateral sides.

It is possible to employ the strain gauge 7 with the structure as described in the second embodiment.

A fifth embodiment of the present invention will be described referring to FIG. 6. The explanation of the similar structures to those described in the first embodiment will be omitted.

Figure 6:
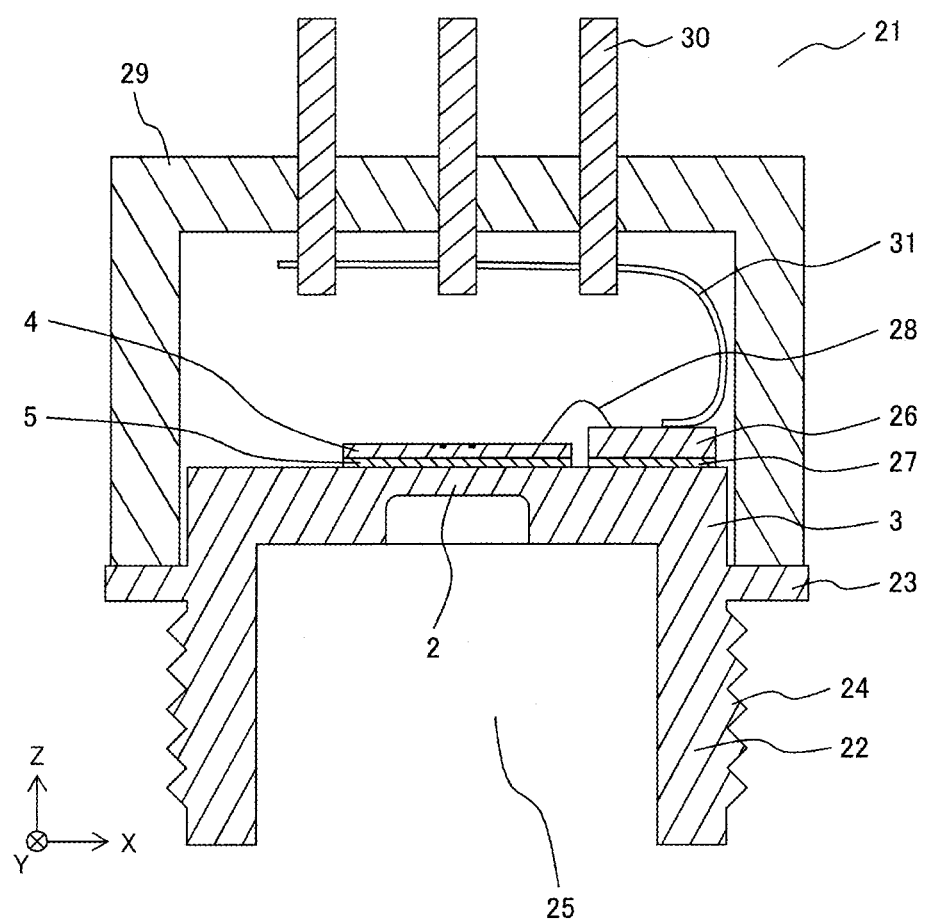
FIG. 6 is a sectional view of a fifth embodiment according to the present invention.

FIG. 6 is a sectional view illustrating the fifth embodiment of the pressure sensor according to the present invention. This embodiment represents an exemplary structure of a pressure sensor assembly 21 as a product formed by assembling the pressure sensor according to the first to the fourth embodiments.

The sensor housing 3 is configured as described in the first to the fourth embodiments, and further includes a cylindrical portion 22 having the cylindrical outer periphery extending downward as well as a flange portion 23 and a screw portion 24 integrally formed on the outer surface. The screw portion 24 is a male screw for the tube, which is fixed to the piping of the measurement object using the joint (not shown) for the female screw. A pressure inlet 25 is formed inside the cylindrical portion 22, and through the pressure inlet 25, the liquid or gas as the measurement object is introduced to the surface of the diaphragm 2. A wiring substrate 26 is formed on the upper surface of the sensor housing 3 so as to be adjacent to the sensor chip 4. The wiring substrate 26 is bonded onto the upper surface of the sensor housing 3 using an adhesive agent 27. The sensor chip 4 and an electrode pad of the wiring substrate 26 are electrically coupled with a wire 28. A cylindrical cover 29 is attached in contact with the flange portion 23 of the sensor housing 3 so as to protect the surface of the sensor chip 4 and its periphery. A plurality of external electrode pins 30 are provided extending from the cover 29 while piercing therethrough. The external electrode pins 30 and the wiring substrate 26 are electrically coupled with a flexible wiring substrate 31. The sensor chip 4 transmits the signal to the outside via the wire 28, the wiring substrate 26, the flexible wiring substrate 31, and the external electrode pins 30. The structure of this embodiment is capable of forming the pressure sensor assembly 21 which can be easily attached to the piping of the device for the measurement object, and providing wiring for power supply to the sensor and take-out of the signal.

The first to the fifth embodiments according to the present invention ensure to realize the pressure sensor with small variation in the sensor characteristics owing to machining error and assembly error.

The result of verification with respect to the effect derived from the present invention will be described.

Figure 7:
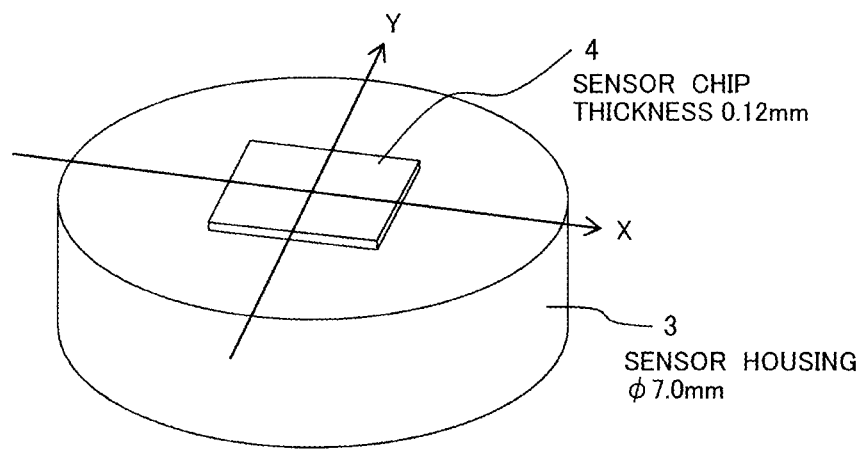
FIG. 7 is a perspective view showing an overview of a model shape used for verification through analysis.

The numerical analysis through finite element method (FEM) was performed for confirmation on the effect of lessening the influence of the strain gauge misalignment. FIG. 7 is a perspective view illustrating the model shape used for the analysis. The sensor housing is formed to have the cylindrical shape with diameter of 7 mm, and the thickness of the sensor chip is set to 0.12 mm. The comparison was made by changing the shape of the diaphragm and the size of the sensor chip.

Figure 8:
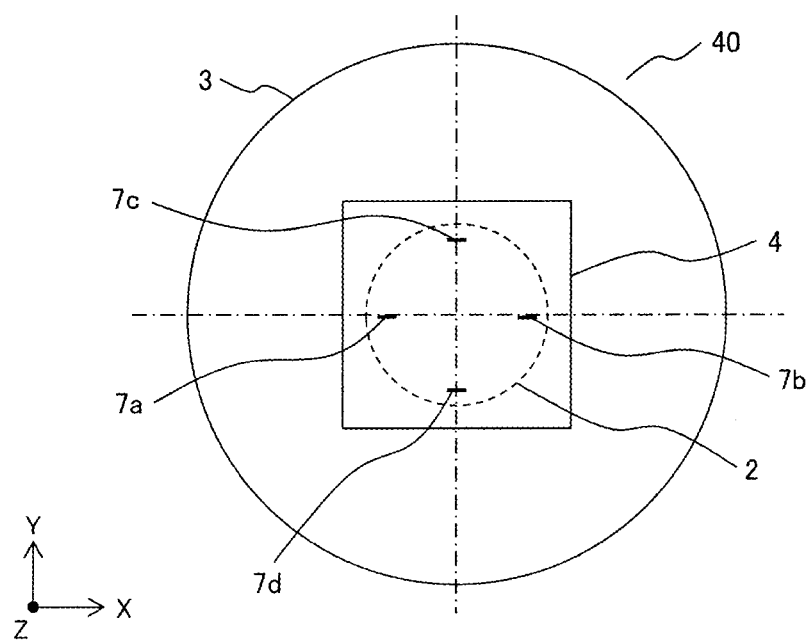
FIG. 8 is a plan view showing a structure of a generally employed pressure sensor.
Figure 9:
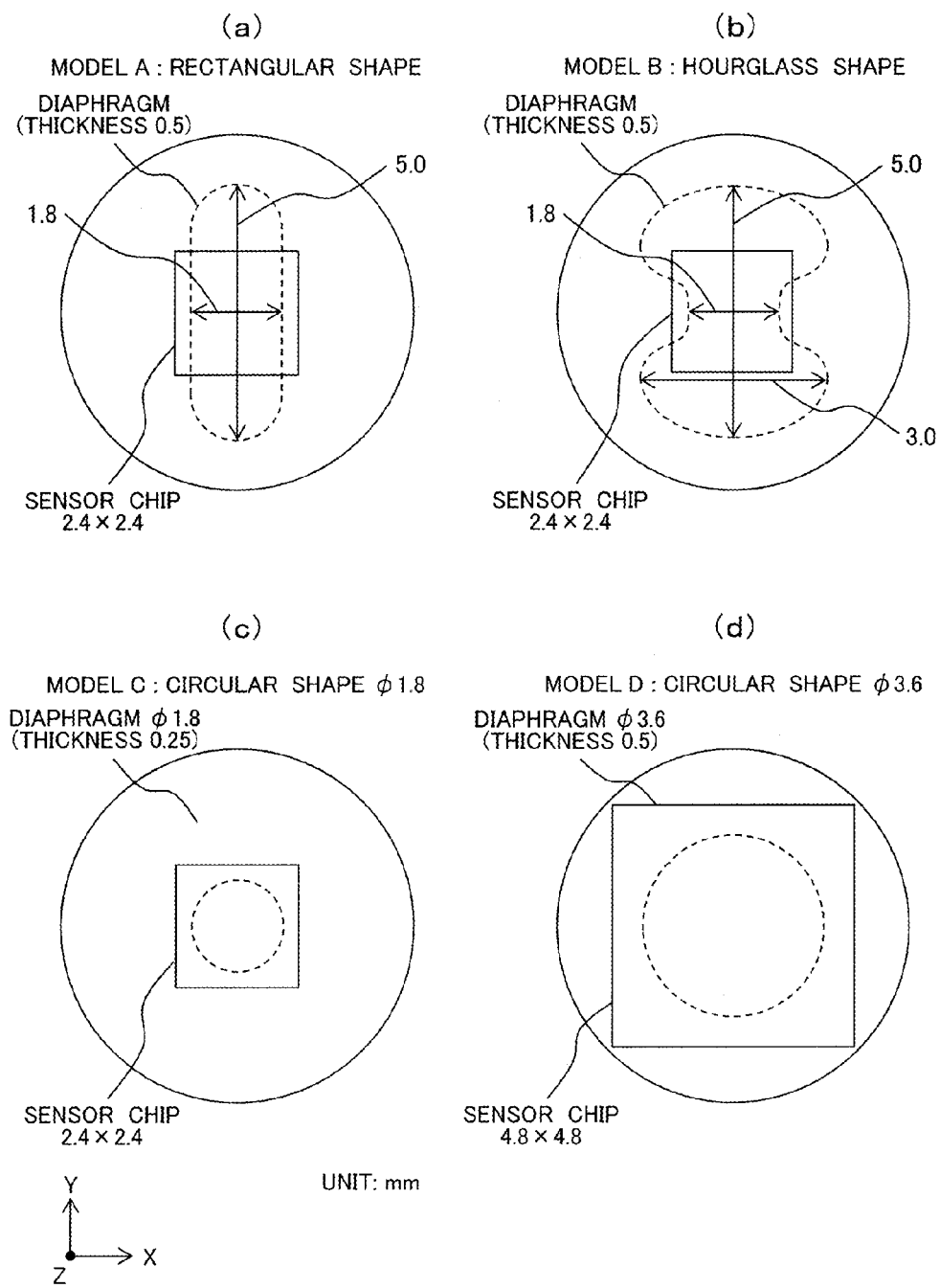
FIGS. 9(a)-(d) present plan views showing each dimension of four models used for verification through analysis.

FIG. 8 is a plan view showing a structure of a generally employed pressure sensor 40 as a comparative example. The diaphragm 2 has a circular shape, and the sensor chip 4 has a square shape with its size larger than the diaphragm 2. The first to the fourth strain gauges 7a to 7d formed on the surface of the sensor chip 4 are arranged at the outer periphery of the diaphragm 2 so that all the current directions are aligned in the X axial direction. The first strain gauge 7a and the second strain gauge 7b are disposed on the center line along the X axis, and the third and the fourth strain gauges are disposed on the center line along the Y axis. In the region at the outer periphery of the diaphragm, the stress in the radial direction becomes the compressive stress, and the stress in the circumferential direction becomes the tensile stress. Therefore, the stress difference occurs between the strain gauges, thus providing the sensor sensitivity.

The method of calculating the output of the pressure sensor derived from the stress generated in the strain gauge will be described.

Both in the pressure sensor according to the present invention, and the generally employed pressure sensor as shown in FIG. 8, the stress similarly acts on the first strain gauge 7a and the second strain gauge 7b arranged along the X axis, which may be considered that the resistance equally changes. Similarly, the resistance change of the third strain gauge 7c is equal to that of the fourth strain gauge 7d. Assuming that the initial resistance $R_0$ is equal for all the strain gauges, each resistance of the strain gauges will be expressed by the following formulae.

First and second strain gauges: $R_1 = R_0 + \Delta R_1$ (1)

Third and fourth strain gauges: $R_3 = R_0 + \Delta R_3$ (2)

The voltage change rate $V_{out}/V_{cc}$ derived from the bridge circuit as shown in FIG. 2 will be expressed as follows.

$$\frac{V_{out}}{V_{cc}} = \frac{R_1}{R_3 + R_1} - \frac{R_3}{R_1 + R_3} = \frac{R_1 - R_3}{R_1 + R_3} = \frac{\Delta R_1 - \Delta R_3}{2R_0 + \Delta R_1 + \Delta R_3} \quad (3)$$

The resistance change values $\Delta R_1$ and $\Delta R_3$ are obtained as follows. Assuming that components of the stress generated in the first and the second strain gauges in X and Y directions are set to $\sigma_x$ and $\sigma_y$, and the vertical and horizontal piezoresistance coefficients of the strain gauge are set to $\pi_l$ and $\pi_t$, the resistance change $\Delta R_1$ will be expressed as follows.

$$\Delta R_1 = R_0(\pi_l \cdot \sigma_x + \pi_t \cdot \sigma_y) \quad (4)$$

Meanwhile, the same stress is generated in the third and the fourth strain gauges. As the gauges are arranged along the Y direction, the stress in the current direction is set to $\sigma_y$, and the stress component in the direction vertical to the current direction is set to $\sigma_x$. Then the resistance change $\Delta R_3$ will be expressed as follows.

$$\Delta R_3 = R_0(\pi_l \cdot \sigma_y + \pi_t \cdot \sigma_x) \quad (5)$$

As the stress in the Z direction becomes substantially zero, such value was ignored. As the generally employed pressure sensor as shown in FIG. 8 exhibits a symmetric property, the arrangement of the third and the fourth strain gauges along the Y direction is positionally equivalent to that of the first and the second strain gauges. Therefore, the equation (5) is established. Assuming that the resistance change is sufficiently smaller than the initial resistance ($2R_0 \ll \Delta R_1 + \Delta R_3$), the following formula may be established by substituting the formulae (4) and (5) for the formula (3).

$$\frac{V_{out}}{V_{cc}} = \frac{1}{2}(\pi_l - \pi_t)(\sigma_x - \sigma_y) \quad (6)$$

The following formula (7) is established as the $\pi_l$ and $\pi_t$ take substantially the same values each having opposite sign in the p-type silicon <110> direction.

$$\frac{V_{out}}{V_{cc}} \cong \pi_l(\sigma_x - \sigma_y) \quad (7)$$

As described above, the output change rate of the pressure sensor, that is, sensitivity is proportional to the stress difference $\sigma_x - \sigma_y$, difference between the stresses acting on the strain gauge in the X direction and on the strain gauge in the Y direction.

FIGS. 9(a)-(d) present plan views of the analysis models compared through the FEM analysis. In each model, the sensor chip is disposed at the center of the sensor housing. The stress difference on the sensor chip surface on the center line along the X axis, that is, $\sigma_x - \sigma_y$ is obtained. It is assumed that the strain gauge is disposed at the position where the stress difference is maximized.

The model A representing the first embodiment according to the present invention has the diaphragm with the lateral length of 1.8 mm, and the longitudinal length of 5 mm. The end portion of the diaphragm in the longitudinal direction has a semicircular shape with radius of 0.9 mm. The diaphragm has the thickness of 0.5 mm, and the sensor chip has the size of 2.4 mm×2.4 mm.

The model B representing the third embodiment according to the present invention has the diaphragm with an hourglass-like shape formed by extending the lateral length at the longitudinal end portions of the diaphragm as the model A. Likewise the model A, the lateral length of the diaphragm at the center in the longitudinal direction is set to 1.8 mm, and the maximum lateral length between the center and the end portion in the longitudinal direction is set to 3.0 mm. The diaphragm has the thickness of 0.5 mm, and the sensor chip has the size of 2.4 mm×2.4 mm.

The model C represents the generally employed pressure sensor as a comparative example. The sensor chip has the size of 2.4 mm×2.4 mm likewise the models A and B. The diaphragm has a circular shape with diameter of 1.8 mm so as to be disposed inside the sensor chip. As the diaphragm is smaller than that of any other model, its thickness is reduced as thin as 0.25 mm.

The model D represents the pressure sensor having each dimension of the diaphragm and the sensor chip doubled compared with the model C. The diaphragm has the circular shape with diameter of 3.6 mm, and the sensor chip has the size of 4.8 mm×4.8 mm. The diaphragm has the thickness of 0.5 mm. This model is made on the assumption that the diaphragm is enlarged by allowing increase in the sensor chip size so as to be fit in the sensor housing.

FIGS. 10(a)-(d) show results of the analysis performed by applying the pressure of 1 MPa to the models A to D, respectively in the form of graphs each indicating the stress generated on the sensor chip surface on the center line along the X axis. Each graph shows the stress $\sigma_x$, $\sigma_y$, and the stress difference $\sigma_x - \sigma_y$.

Figure 10:
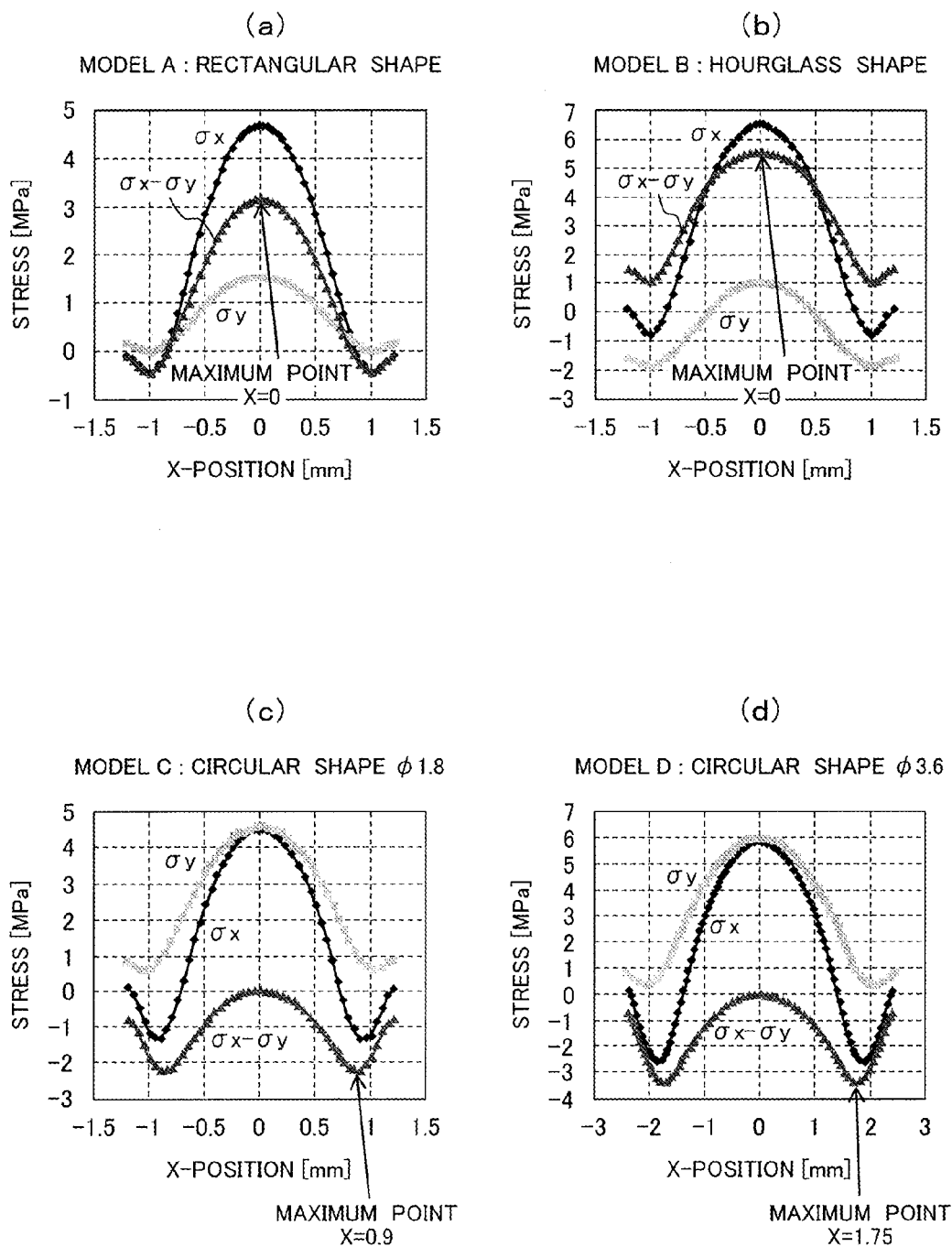
FIGS. 10(a)-(d) present graphs representing analytical results of pressure application to the respective models.

Referring to FIG. 10 showing the model A having the longitudinally long diaphragm, the stress $\sigma_x$ is larger than $\sigma_y$ at the center where the stress difference is maximized. The ratio of the maximum value between $\sigma_x - \sigma_y$ and $\sigma_x$ defined as the stress utilization efficiency in this case measures 0.67.

Referring to the model B having the diaphragm with longitudinally wide end portions, the stress at the center in the Y direction is lowered, resulting in increased stress difference. The stress utilization efficiency in this case measures 0.84.

Referring to the model C, the relationship of $\sigma_x = \sigma_y$ is established at the center of the diaphragm. Meanwhile, the stress $\sigma_x$ and $\sigma_y$ on the outer periphery of the diaphragm become the compressive stress and the tensile stress, respectively. The stress difference is maximized at the point 0.9 mm apart from the center, which corresponds to an edge position of the diaphragm. The ratio of the absolute values at this point between the $\sigma_x$ and the $\sigma_x - \sigma_y$ defined as the stress utilization efficiency measures 1.66. Since the high stress is generated at the center of the diaphragm, the ratio between $\sigma_x$ and the $\sigma_x - \sigma_y$ at the center defined as the stress utilization efficiency measures 0.48.

Referring to the model D, the stress distribution is similar to that of the model C. The stress difference is maximized at the position 1.75 mm apart from the center, which is located slightly inside the diaphragm edge. The stress utilization efficiency as the ratio with respect to the stress $\sigma_x$ at the maximum point of the stress difference measures 1.42. The ratio with respect to the stress $\sigma_x$ at the center of the diaphragm measures 0.56.

As the above-described results clearly show, compared with the generally employed structure, the pressure sensor according to the present invention exhibits higher stress utilization efficiency defined in view of the maximum stress generated in the sensor chip. The results also show that the model B with the hourglass-shape diaphragm exhibits further higher stress utilization efficiency than the model A having the rectangular diaphragm.

Figure 11:
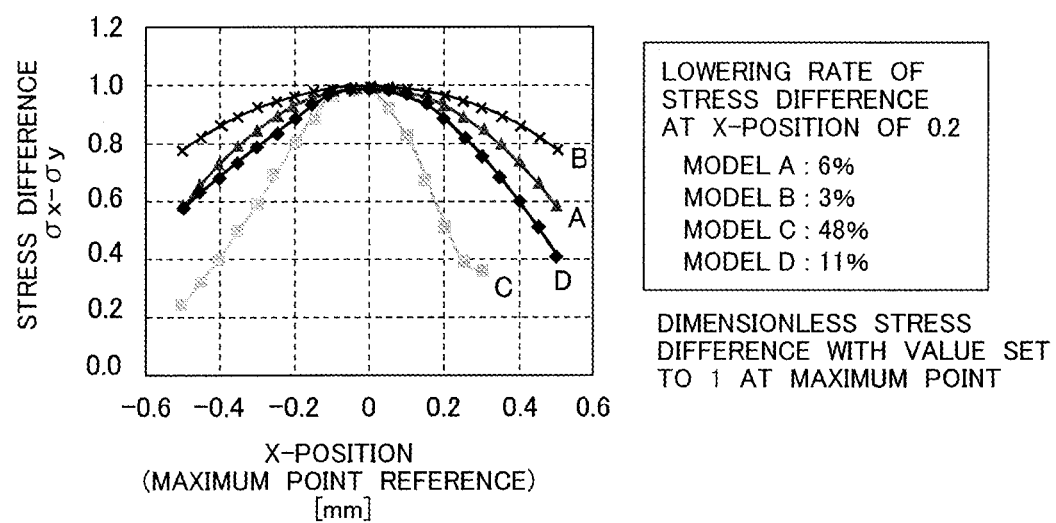
FIG. 11 is a graph representing comparison among the respective models with respect to the stress distributions as analytical results of the pressure application.
Figure 12:
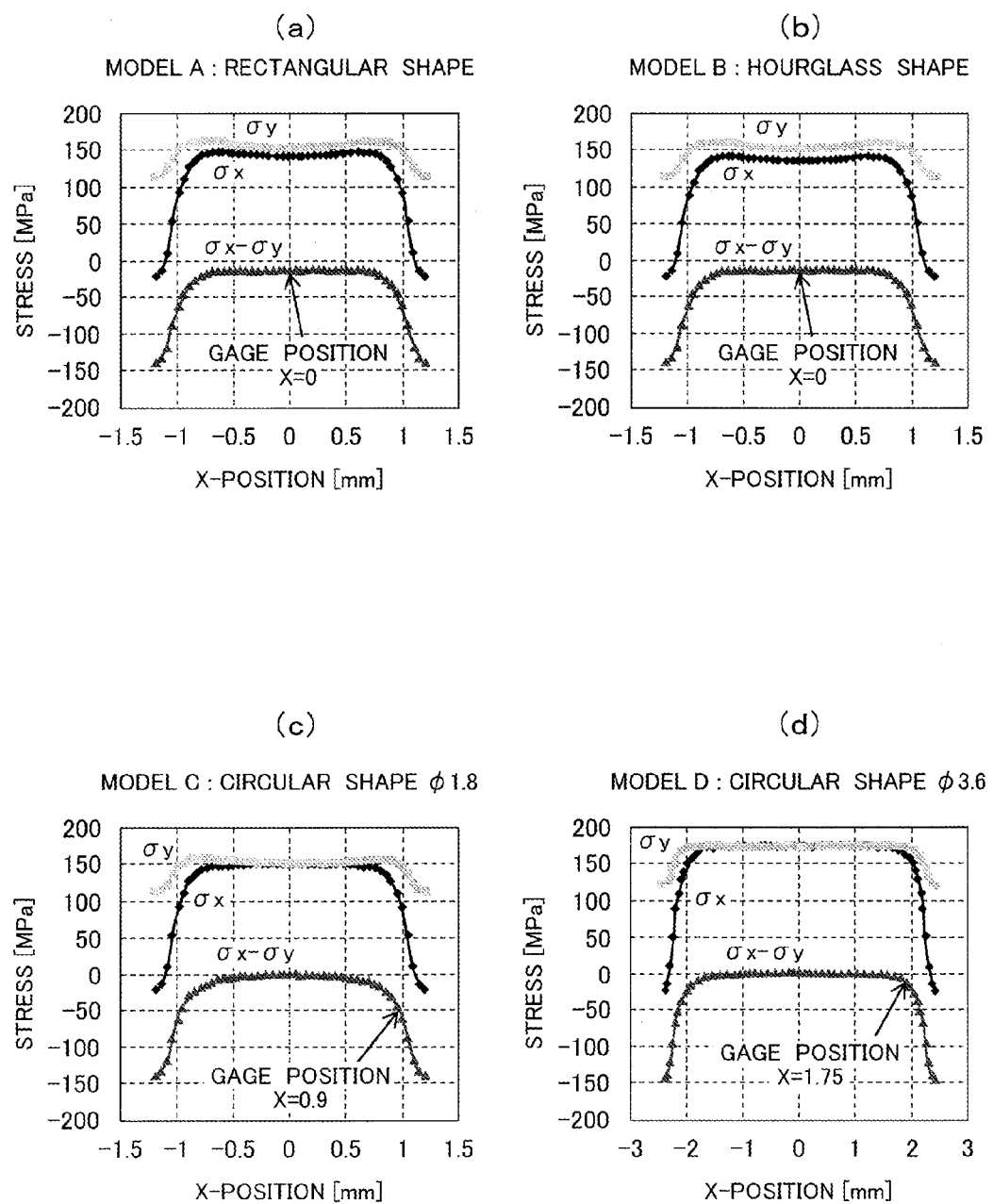
FIGS. 12(a)-(d) present graphs representing analytical results of the temperature changes of the respective models.

FIG. 11 is a graph showing each stress distribution around the maximum point with respect to the stress difference $\sigma_x - \sigma_y$ for comparison among the respective models. On the X axis, the maximum point of the stress difference is set to zero, and on the Y axis, the stress difference at the maximum point is set to 1 for reference, respectively. Compared with the model C as the generally employed pressure sensor, the model A exhibits the less steep stress distribution. FIG. 11 also shows each rate in lowering of the stress difference at the X position displaced by 0.2 mm from the stress difference at the maximum point. The lowering rate of the model C measures 48%. Meanwhile, the lowering rate of the model A is kept as low as 6%. This allows confirmation about the effect of suppressing change in the output even if misalignment of the strain gauge occurs.

The model B exhibits the stress distribution less steep than the model A, further reducing the lowering rate of the stress difference at the point of 0.2 mm as low as 3%.

The model D exhibits the stress difference distribution less steep than the model C owing to the enlarged diaphragm size. However, the area of the sensor chip is four times larger than other models, leading to increase in the cost for manufacturing the sensor chip by four times. The model D shows the lowering rate of the stress difference of 11% at the point of 0.2 mm. This clearly shows that the models A and B according to the present invention allow better suppression of the influence of the misalignment.

The results of examination with respect to the sensor output variation in response to the temperature change will be described. FIGS. 12(a)-(d) show graphs representing analysis results of changing each temperature of the models A to D by 100°. Likewise FIG. 10, the stress generated on the sensor chip surface is represented on the center line along the X axis.

The linear expansion coefficient difference between the silicon for forming the sensor chip and the stainless steel for forming the diaphragm will generate the stress on the sensor chip surface. Basically, the thermal stress is isotropically active so that the stress $\sigma_x$ becomes equal to the stress $\sigma_y$, which is unlikely to cause the output variation. Referring to the results of the models C and D, the stress difference at the center of the sensor chip is close to zero. However, the stress difference around the end portion of the sensor chip shows steep change. The stress difference also changes around the edge of the diaphragm. As the thin diaphragm is surrounded by the thick sensor housing, such change is considered to be caused by the variable deformation condition around the edge of the diaphragm as the boundary. Referring to the models C and D, the strain gauges are disposed near the edge of the diaphragm. It is therefore considered that the stress is likely to be changed in response to the misalignment of the strain gauge. Referring to the results of the models A and B, a slight stress difference is observed at the center of the sensor chip. This is thought to be caused under the influence that the diaphragm shape is not isotropic. The stress difference distribution is observed substantially flat at the center of the sensor chip. The models A and B having the strain gauges disposed at the center of the sensor chip are considered to be less influenced by the misalignment of the strain gauge.

Figure 13:
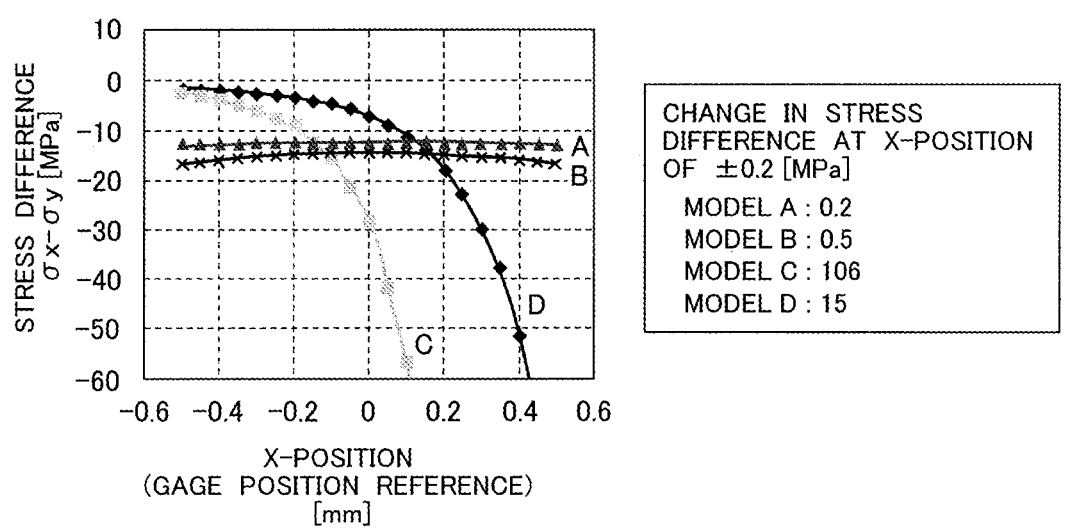
FIG. 13 is a graph representing comparison among the respective models with respect to the stress distributions as analytical results of the temperature change.

Likewise FIG. 11, FIG. 13 is a graph showing each stress distribution around the gauge position with respect to the stress difference for comparison among the respective models. Assuming that the maximum point derived from the analysis of the pressure application is defined as the gauge position, the gauge position is set to 0 on the X axis for reference. FIG. 13 shows variation of the stress difference in the range of +/−0.2 mm with respect to the gauge position as the center. Compared with the models C and D, the models A and B each as the structure according to the present invention show the stress difference variation suppressed significantly small. The structure according to the present invention provides the effect that the output variation in response to the temperature change is unlikely to occur by misalignment of the strain gauge. The temperature characteristic is less variable, which provides the effect of simplifying the temperature correction.

REFERENCE SIGNS LIST

1: pressure sensor,
2: diaphragm,
3: sensor housing,
4: sensor chip,
5: junction layer,
6: gauge region,
7: strain gauge,
10: X center line,
11: diaphragm center dimension,
12: diaphragm end dimension,
13: silicon substrate,
14: sensor diaphragm,
21: pressure sensor assembly,
22: cylindrical portion,
23: flange portion,
24: screw portion,
25: pressure inlet,
26: wiring substrate,
27: adhesive agent,
28: wire,
29: cover,
30: external electrode pin,
31: flexible wiring substrate, and
40: generally employed pressure sensor.

The invention claimed is:

1. A pressure sensor comprising a diaphragm having longitudinal sides extending in a longitudinal direction and lateral sides connecting the longitudinal sides in a lateral direction, and four strain gauges disposed on the diaphragm, wherein:
   the four strain gauges are arranged at a center of the diaphragm; and
   two of the four strain gauges are arranged along the lateral direction, and the other two strain gauges are arranged along the longitudinal direction,
   wherein the diaphragm includes, along the longitudinal direction, a center portion and opposing end portions, and wherein the end portions include a dimension in the lateral direction which is larger than a dimension in the lateral direction at the center portion.

2. The pressure sensor according to claim 1, wherein each of the four strain gauges is formed of a p-type single crystal silicon along <110> crystal orientation.

3. The pressure sensor according to claim 1, wherein the diaphragm has an hour-glass shape.

4. A pressure sensor comprising a diaphragm having longitudinal sides extending in a longitudinal direction and lateral sides connecting the longitudinal sides in a lateral direction, a sensor chip formed on the diaphragm, and four strain gauges disposed on the sensor chip, wherein:

the sensor chip is applied on the diaphragm so that the four strain gauges are positioned at a center of the diaphragm; and two of the four strain gauges are arranged along the lateral direction, and other two strain gauges are arranged along the longitudinal direction, wherein the diaphragm has a dimension in the lateral direction at a position around the center of the diaphragm smaller than a dimension of the sensor chip, and wherein the diaphragm has a dimension in the longitudinal direction larger than the dimension of the sensor chip.

5. The pressure sensor according to claim 4, wherein the diaphragm includes, along the longitudinal direction, a center portion and opposing end portions, and wherein the end portions include a dimension in the lateral direction which is larger than a dimension in the lateral direction at the center portion.

6. The pressure sensor according to claim 4, wherein the lateral sides are curved.

7. The pressure sensor according to claim 6, wherein the longitudinal sides are linear.

8. The pressure sensor according to claim 6, wherein the diaphragm has an hour-glass shape.

9. A pressure sensor comprising a diaphragm having longitudinal sides extending in a longitudinal direction and lateral sides connecting the longitudinal sides in a lateral direction, a sensor chip formed on the diaphragm, and four strain gauges disposed on the sensor chip, wherein:

the sensor chip is applied on the diaphragm so that the four strain gauges are positioned at a center of the diaphragm; and two of the four strain gauges are arranged along the lateral direction, and other two strain gauges are arranged along the longitudinal direction, wherein the diaphragm includes, along the longitudinal direction, a center portion and opposing end portions, and wherein the end portions include a dimension in the lateral direction which is larger than a dimension in the lateral direction at the center portion.

* * * * *